Sept. 15, 1970    R. MITGAU    3,528,609
MOLDED BODY FOR MAKING INSULATED CONNECTIONS IN RAILS
Filed Sept. 30, 1966
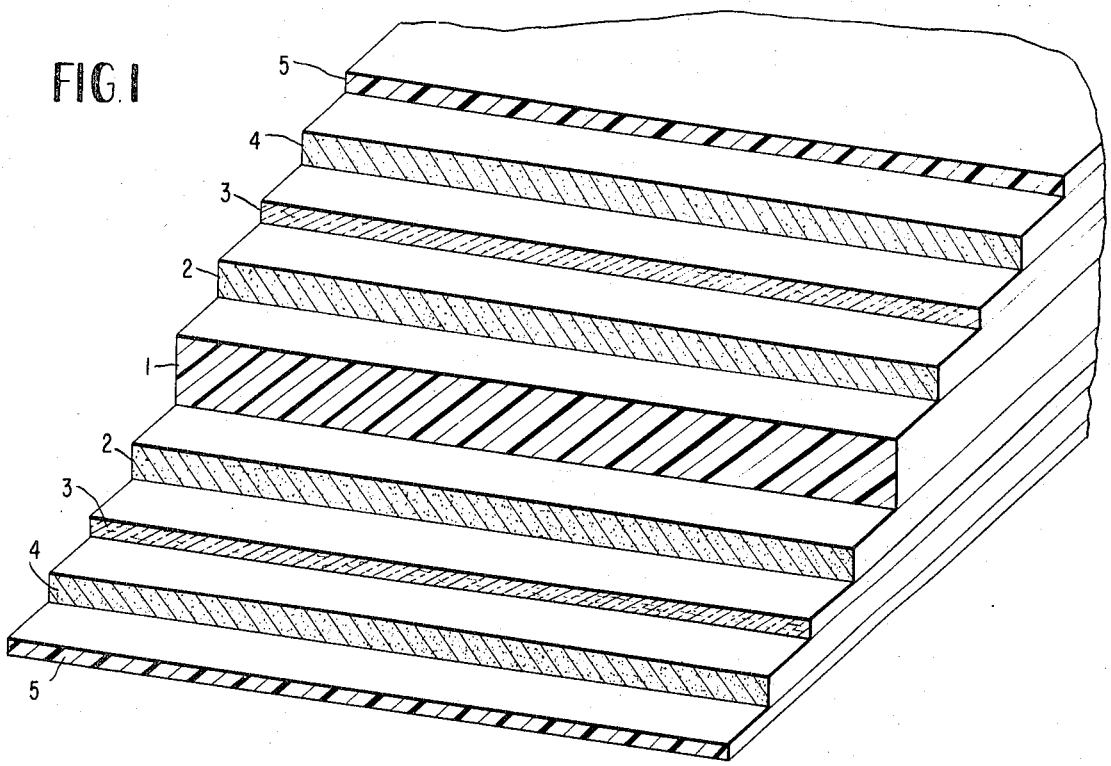
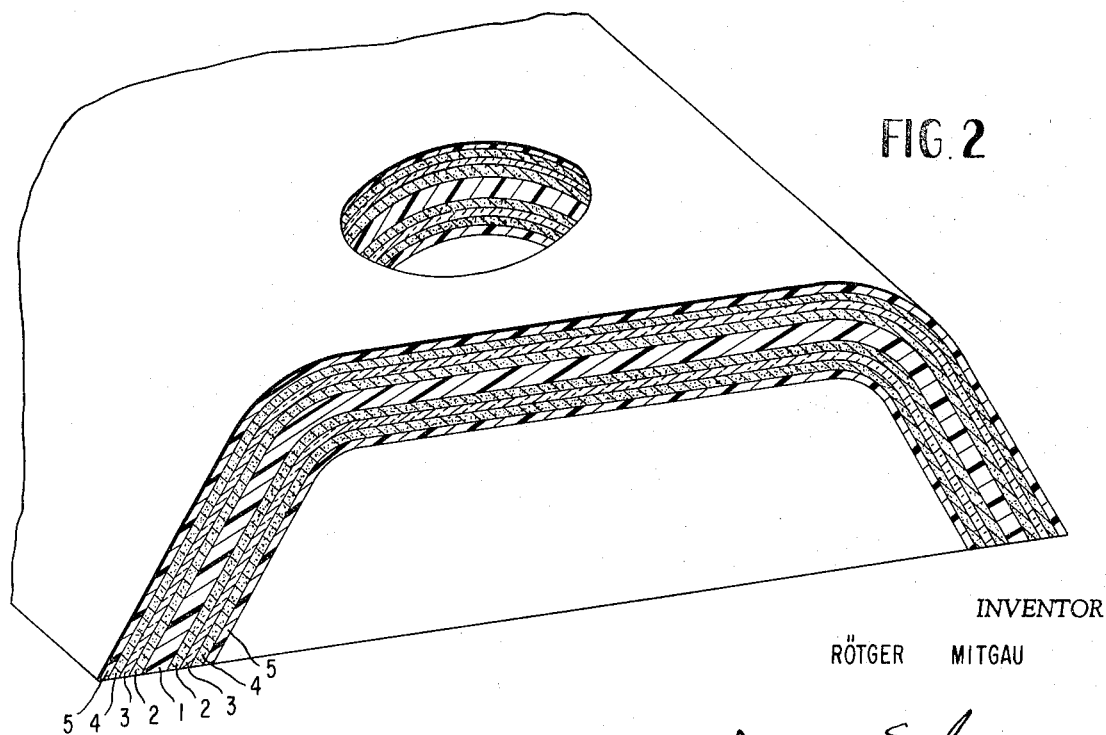
INVENTOR
RÖTGER MITGAU
BY James E. Bryan
ATTORNEY

United States Patent Office 3,528,609
Patented Sept. 15, 1970

3,528,609
MOLDED BODY FOR MAKING INSULATED CONNECTIONS IN RAILS
Rötger Mitgau, Essen-Kupferdreh, Germany, assignor to The Goldschmidt, A.G., Essen, Germany, a corporation of Germany
Filed Sept. 30, 1966, Ser. No. 583,385
Claims priority, application Germany, Oct. 19, 1965, G 44,975
Int. Cl. E01b 11/00
U.S. Cl. 238—152                            8 Claims

ABSTRACT OF THE DISCLOSURE

This invention relates to a molded body for making an insulated connection between a fish plate and a rail which comprises a pressure-resisting insulating layer having on each side thereof a heat-hardenable cement which is adhesive to metal.

---

This invention relates to a molded body for use in making insulated connections in rails and, more particularly, to an insulated body to be positioned between a fish plate and a rail.

In the operation and control of railway electrical equipment, particularly when welded rails are employed having no gap, it may be necessary to connect the rails at certain places in an electrically insulated manner.

This insulating connection of two rails is effected by means of two fish plates which are positioned on both sides of the rail and connected with each other by means of bolts. An insulating body is interposed, in each case, between the fish plate and the rail.

It previously has been attempted to coat steel fish plates with an insulating synthetic material or plastic and, also, it has been attempted to make the fish plates from a synthetic material, such as a polyamide for example. Neither the covering of the fish plates nor the manufacture thereof from synthetic material has proved to be successful, however, since the friction between the rail and the plastic coating or the plastic fish plate is too small.

On the other hand, it has been found suitable to position an insulating body between the fish plate and the rail, the insulating body being cemented in place. For this purpose, a method was developed which is performed approximately as follows: The cementing surfaces at the rail and the fish plate are initially subjected to a rough cleaning by brushing, descaled by flame cleaning, again mechanically cleaned, and then rinsed. Then a fluid, cold-hardennig two-component adhesive or cement is applied to one side of each of the fish plates and both sides of the rail. Separately therefrom, insulating bodies are coated on both sides thereof with the same adhesive and a glass fiber fabric or web is placed upon the adhesive layer. The insulating bodies which have been pretreated in this fashion then are inserted betwen the fish plates and the rail. The fish plates, being mounted on both sides of the rail, are forced against the rail by means of bolts. In order to accelerate hardening of the cold-hardening adhesive, the cemented area is heated to 100 to 120° C., by means of an oven or a heating dome for example, for a period of about 20 minutes. This accelerated hardening is required since the track section can not be taken out of service for a prolonged period of time.

This method of operation involves a number of disadvantages, however. It requires great care and cleanliness so that the necessary reliability of the cemented connections is achieved. In this regard, it must be considered that working conditions existing at a track construction site make it difficult to meet this requirement. In view of the fact that, due to the manual application of the adhesive or cement, the amounts consumed will not always be uniform, it is necessary to provide for a certain excess of the two-component adhesive which becomes unusable after a certain time in the mixing pot. In addition, the foregoing method is subject to all of the disadvantages of a manual preparation, i.e., the hardener and the adhesive must be measured and mixed very carefully, the adhesive must be immediately applied to the fish plates, to the rail, and to both sides of the insulating laminating material in a layer which is sufficiently thick yet not too thick. During humid weather, particularly when it is raining, the danger arises that the adhesive or cement will become unusable as a result of the action of water thereon. The method itself also is time-consuming and, therefore, expensive.

The foregoing disadvantages are effectively eliminated by the use of the molded body of the present invention. The molded body of the present invention comprises a pressure-resistant insulating center layer which is provided on both sides thereof with a heat-hardenable cement which is adhesive to metal. Thus, the molded body does not have to be fabricated at the track construction site but, instead, may be supplied to such a site in a condition ready for use. In order to prevent the molded bodies from sticking together, and in order to prevent the adhesive layer from becoming dirty, the bodies preferably are provided at the outer surfaces thereof with a removable foil, such as a polyethylene foil for example. It has been found desirable to color the foil so as to make it evident when it has been removed prior to the use of the molded body.

In a preferred embodiment of the molded body, the cement or adhesive is in the form of a layer or film. Such a layer may include a fabric which is impregnated and coated with the cement or adhesive. For the purpose of increasing the mechanical stability, it has been found to be particularly advantageous to use fabrics or mats made from glass fibers. In order to compensate for any unevenness of the fish plates and the rail flanks, it may be especially advantageous to provide, on each side of the insulating center layer, several cement or adhesive layers instead of a single layer. Fabrics or mats, especially made from glass fibers, may be interposed between the individual cement layer.

The insulating center layer preferably is formed of a laminated plastic. This laminated plastic should have good insulating properties and also should be pressure-resistant and inexpensive. Phenol resin laminates have been found to be especially suitable but it is equally feasible to use epoxy resin laminates or other insulating laminated plastics.

Instead of laminated plastics it also is possible to use sheets made from insulating plastic material, for example a polyamide, the thickness of the sheets being about 1 to 3 mm.

The heat-hardenable cements employed which are adhesive to metal may consist o fmixtures o fresin condensates and vinyl polymerizates. Exemplary of such a cement which is adhesive to metal is a glass fiber mat impregnated with phenol resin, which impregnated mat is coated on both sides thereof with polyvinyl acetal powder and applied to the insulating laminated plastic center layer at molding pressure. Also suitable are epoxy resins which may be applied to the insulating laminated plastic either in liquid form or from a melt with a fabric or mat being included, if desired. It also is possible to apply cementing agents from a solution in an organic solvent and to remove the solvent by evaporation.

When the bolts, which serve to effect the connection of the fish plates with the rails, are tightened, the molded body conforms to the rail profile while being deformed. It is of advantage, however, to fabricate the molded body in a form which corresponds to the rail profile. The molded body includes appropriate bores for permitting the connecting bolts to pass through.

A cemented rail-fish plate connection using the molded body of the present invention is prepared as follows: The rail and the fish plates are freed in a conventional manner of any dirt and scale adhering thereto within the area to be cemented. The covering foils are removed from both sides of molded bodies which then are inserted between the fish plates and the rail and the bolts for connecting the fish plates and the rail are tightened. When using molded bodies according to the present invention which contain heat-hardenable cements based on phenol resin/polyvinyl acetal for example, a hardening temperature of 150 to 175° C. is preferred and this temperature should be maintained for about 10 minutes.

One embodiment of the molded body of the present invention is shown in the accompanying drawings in which:

FIG. 1 is a representation of the various layers of the molded body, and

FIG. 2 is a fragmentary view of one end of the molded body.

Referring to the drawings, in FIG. 1, reference numeral 1 identifies the insulating laminated material, reference numerals 2 and 4 identify the cement layers which are adhesive to metal, reference numeral 3 designates glass fiber webs and reference numeral 5 designates polyethylene foils.

FIG. 2 illustrates the molded body preformed in a shape adapted to conform to a rail profile.

What is claimed is:

1. A molded body for making an insulated connection between a fish plate and a rail which comprises a pressure-resistant insulating layer having on each side thereof a heat-hardenable cement which is adhesive to metal.

2. A molded body according to claim 1 in which the cement is in the form of a layer.

3. A molded body according to claim 2 in which the cement layer comprises a fabric impregnated with cement.

4. A molded body according to claim 3 in which the fabric is made of glass fibers.

5. A molded body according to claim 2 including a plurality of cement layers with fabric layers interposed between them.

6. A molded body according to claim 1 in which the pressure-resistant insulating layer is a laminated plastic.

7. A molded body according to claim 1 in which the outside of the body is covered with a removable foil.

8. A molded body according to claim 7 in which the foil is polyethylene.

References Cited

UNITED STATES PATENTS

| | | | |
|---|---|---|---|
| 3,152,950 | 10/1964 | Palmquist et al. | 161—406 XR |
| 2,965,532 | 12/1960 | Taylor | 161—406 XR |
| 3,173,826 | 3/1965 | Campbell et al. | 161—406 XR |
| 3,416,728 | 12/1968 | Hamilton | 238—152 |
| 3,154,250 | 10/1964 | Lansing | 238—152 |
| 3,335,955 | 8/1967 | Palfreyman | 238—283 |
| 2,909,204 | 10/1959 | Somerville | 161—186 XR |
| 3,284,398 | 11/1966 | Warren et al. | 161—186 XR |

FOREIGN PATENTS 1,025,318 4/1966 Great Britain.

PHILIP DIER, Primary Examiner

U.S. Cl. X.R.

161—184, 198, 406; 238—151, 283